United States Patent
Wieland et al.

(10) Patent No.: US 9,550,217 B2
(45) Date of Patent: Jan. 24, 2017

(54) EXHAUST COMPONENT CLEANING AND REQUALIFICATION PROCESS

(71) Applicant: Cummins IP, Inc., Columbus, IN (US)

(72) Inventors: Todd M. Wieland, Columbus, IN (US); Leslie E. Freeman, Columbus, IN (US); David G. Eames, Columbus, IN (US); Duane J. Szymanski, Columbus, IN (US); Mark G. Tang, Columbus, IN (US); William A. MacGregor, Columbus, IN (US); Leigh A. Rogoski, Columbus, IN (US)

(73) Assignee: CUMMINS IP, INC., Columbus, IN (US)

( * ) Notice: Subject to any disclaimer, the term of this patent is extended or adjusted under 35 U.S.C. 154(b) by 507 days.

(21) Appl. No.: 14/010,371

(22) Filed: Aug. 26, 2013

(65) Prior Publication Data

US 2014/0053865 A1 Feb. 27, 2014

Related U.S. Application Data (60) Provisional application No. 61/693,056, filed on Aug. 24, 2012.

(51) Int. Cl.
 *B08B 3/04* (2006.01)
 *B08B 3/08* (2006.01)
 (Continued)

(52) U.S. Cl.
 CPC ............ *B08B 3/08* (2013.01); *B01D 41/04* (2013.01); *B08B 3/12* (2013.01); *B08B 5/02* (2013.01);
 (Continued)

(58) Field of Classification Search
 CPC ............ B01D 46/0057; B01D 46/0053; B01D 46/0076; B01D 46/0082; B01D 46/0067; B01D 46/0068; B01D 46/2418; B01D 2279/30; B01D 46/0075; B01D 41/04; F01N 3/02; F01N 3/0222; F01N 3/023; F01N 3/0231; F01N 3/0232; B08B 3/08; B08B 3/12
 See application file for complete search history.

(56) References Cited

U.S. PATENT DOCUMENTS

| | | | |
|---|---|---|---|
| 5,707,453 A | 1/1998 | Shurman et al. | |
| 7,025,811 B2 * | 4/2006 | Streichsbier | B01D 41/04 210/411 |

(Continued)

FOREIGN PATENT DOCUMENTS

| | | |
|---|---|---|
| AU | 16582/83 A | 1/1984 |
| DE | 10 2008 038 026 A1 | 2/2010 |

(Continued)

OTHER PUBLICATIONS

International Search Report and Written Opinion received for PCT/US2013/056673 dated Jan. 30, 2014.

(Continued)

*Primary Examiner* — Bibi Carrillo
(74) *Attorney, Agent, or Firm* — Foley & Lardner LLP (57) ABSTRACT

According to one embodiment, a method for cleaning and requalifying a component of an exhaust aftertreatment system includes inspecting the component using an x-ray processing technique. The method further includes associating the plurality of cleaning techniques with a plurality of compositions of material, and cleaning the component according to at least one of the plurality of cleaning techniques associated with the composition of material.

16 Claims, 5 Drawing Sheets

(51) Int. Cl.
*B08B 3/12* (2006.01)
*B01D 41/04* (2006.01)
*B08B 5/02* (2006.01)
*B08B 13/00* (2006.01)
*B01D 46/00* (2006.01)
*B01D 46/24* (2006.01)
*F01N 3/02* (2006.01)
*F01N 3/022* (2006.01)
*F01N 3/023* (2006.01)

(52) U.S. Cl.
CPC ............ *B08B 13/00* (2013.01); *F01N 3/0237* (2013.01); *B01D 46/0053* (2013.01); *B01D 46/0057* (2013.01); *B01D 46/0067* (2013.01); *B01D 46/0068* (2013.01); *B01D 46/0075* (2013.01); *B01D 46/0082* (2013.01); *B01D 46/2418* (2013.01); *B01D 2279/30* (2013.01); *F01N 3/02* (2013.01); *F01N 3/023* (2013.01); *F01N 3/0222* (2013.01); *F01N 3/0231* (2013.01); *F01N 3/0232* (2013.01)

(56) References Cited

U.S. PATENT DOCUMENTS

| | | |
|---|---|---|
| 2005/0011357 A1 | 1/2005 | Crawley |
| 2008/0083334 A1* | 4/2008 | Bardhan ............... B01D 41/04 95/281 |
| 2010/0307339 A1* | 12/2010 | Tadrous ............. B01D 46/0063 95/280 |
| 2010/0319731 A1 | 12/2010 | Spruegel et al. |
| 2011/0308543 A1 | 12/2011 | Uppili |
| 2012/0138093 A1* | 6/2012 | Sappok .................. B01D 65/02 134/18 |
| 2015/0231544 A1* | 8/2015 | Sappok ............... B01D 46/0075 95/1 |

FOREIGN PATENT DOCUMENTS

| | | |
|---|---|---|
| EP | 1 369 161 A1 | 12/2003 |
| EP | 1 778 956 A1 | 5/2007 |
| GB | 2 416 836 | 2/2006 |
| JP | 10-259387 | 9/1998 |
| JP | 2004-270688 A | 9/2004 |
| JP | 2006-205044 A | 8/2006 |
| RU | 2357810 | 6/2009 |
| WO | WO-2012/088426 | 6/2012 |

OTHER PUBLICATIONS

First Office Action for Chinese Patent Application No. 201380041759.8, issued Nov. 19, 2015, 9 pages.
Extended European Search Report for European Patent Application No. 13831754.0, issued Feb. 23, 2016, 11 pages.

* cited by examiner

EXHAUST COMPONENT CLEANING AND REQUALIFICATION PROCESS

CROSS-REFERENCE TO RELATED APPLICATION

This application claims the benefit of U.S. Provisional Patent Application No. 61/693,056, filed on Aug. 24, 2012, which is incorporated herein by reference.

FIELD

The present application relates generally to exhaust aftertreatment components of an internal combustion engine system, and more specifically to the refurbishment of exhaust aftertreatment components.

BACKGROUND

Some used components of exhaust aftertreatment systems for internal combustion engines are cleaned, requalified, and reused. Several known processes are known for cleaning and requalifying used aftertreatment system components. For example, diesel particulate filters (DPF) often are cleaned via one of a pneumatic and fluidic cleaning process, and requalifed via a visual inspection process.

Conventionally, only one of a pneumatic and fluidic cleaning process is used to clean a single DPF, and logic is not applied to determine which of the pneumatic or fluidic cleaning processes should be used.

Similarly, conventional inspection processes do not utilize computer-processed x-rays to generate side views of the DPFs, and do not rely on the results of the computer-processed x-ray testing to guide the logic of the cleaning process.

SUMMARY

The subject matter of the present application has been developed in response to the present state of the art, and in particular, in response to the problems of and needs from conventional cleaning and requalifying processes for aftertreatment components that have not yet been fully solved by currently available systems. Generally, the subject matter of the present application has been developed to provide an exhaust aftertreatment component cleaning and requalification process, and associated apparatus and system, that overcomes at least some of the above-discussed shortcomings of prior art processes.

According to one embodiment, a method for cleaning and requalifying a component of an exhaust aftertreatment system includes inspecting the component using an x-ray processing technique. The method further includes associating the plurality of cleaning techniques with a plurality of compositions of material, and cleaning the component according to at least one of the plurality of cleaning techniques associated with the composition of material.

In some implementations of the method, the composition of material comprises particular matter accumulation. The plurality of cleaning techniques can include a dry clean technique and a wet wash technique. The plurality of cleaning techniques may further include a high-temperature regeneration technique.

According to certain implementations of the method, the plurality of compositions of material includes ash accumulation and ash plug absorption. The ash accumulation can include multiple ash accumulation thresholds and multiple ash plug absorption thresholds. The component may be cleaned according to at least one of the plurality of cleaning techniques associated with at least one of the multiple ash accumulation thresholds and multiple ash plug absorption thresholds. In one implementation, the component is cleaned according to at least one of the plurality of cleaning techniques associated with both of the multiple ash accumulation thresholds and multiple ash plug absorption thresholds. The ash accumulation thresholds can include at least first and second ash accumulation thresholds and the ash plug absorption thresholds can include at least first and second ash accumulation thresholds. The component may be cleaned according to at least a first cleaning technique if the composition of material includes a first combination of one of the first and second ash accumulation thresholds and one of the first and second ash plug absorption thresholds, and cleaned according to at least a second cleaning technique if the composition of material includes a second combination of one of the first and second ash accumulation thresholds and one of the first and second ash plug absorption thresholds. The first cleaning technique is different than the second cleaning technique, and the first combination is different than the second combination.

In certain implementations of the method, the plurality of compositions of material includes an ash accumulation depth threshold associated with a threshold accumulation of ash on the component within a predetermined distance away from an outlet end of the component. According to some implementations, at least one of the compositions of material is associated with at least two of the plurality of cleaning techniques. Further, the x-ray processing technique can be configured to generate data representing the composition of material across a side wall of the component along an axial length of the component. In some implementations, the method also includes determining at least one exclusion zone along the component, and inspecting the component using an x-ray processing technique includes inspecting only those portions of the component outside of the at least one exclusion zone.

According to another embodiment, a method for cleaning and requalifying a component of an exhaust aftertreatment system includes cleaning the component using a dry clean technique, inspecting the component using an x-ray processing technique after cleaning the component using the dry clean technique, and cleaning the component using a wet wash technique after inspecting the component using the x-ray processing technique.

In some implementations, the method further includes visually inspecting the component before cleaning the component using the dry clean technique. Additionally, the method may include baking the component before cleaning the component using the dry clean technique if visual inspection of the component reveals visible oil deposits on the component. The method can also include scraping the component before cleaning the component using the dry clean technique if visual inspection of the component reveals physical damage.

According to certain implementations, the method also includes cleaning the component using a high-temperature regeneration technique after cleaning the component using the dry clean technique and before cleaning the component using the wet wash technique. The method can further include inspecting the component using an x-ray processing technique after cleaning the component using the wet wash technique. The wet wash technique may include depositing the component into a bath comprising an organic acid, and ultrasonically agitating the bath.

In yet some implementations, the method includes determining an ash plug absorption of the component based on the inspection of the component using the x-ray processing technique. In such implementations, the step of cleaning the component using the wet wash technique occurs only when the ash plug absorption exceeds a threshold.

According to another embodiment, a method for cleaning and requalifying a component of an exhaust aftertreatment system includes depositing the component into a bath comprising an organic acid, and ultrasonically agitating the bath.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Figure 1:
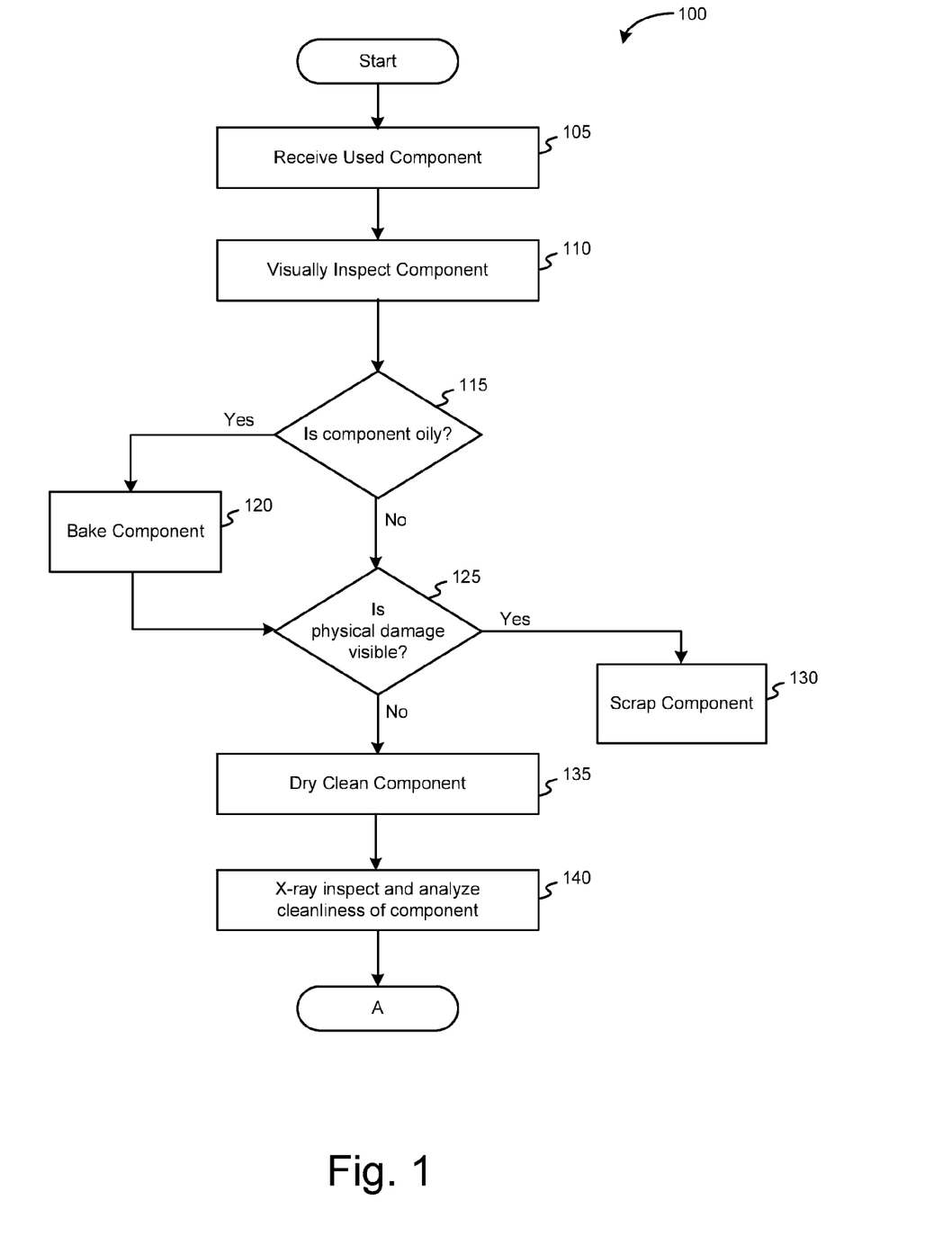
FIG. 1 is a schematic flow chart diagram of a method for cleaning and requalifying a used exhaust aftertreatment component according to one embodiment.

FIG. 1 is one embodiment of a cleaning and requalification process 100 for a used component of an exhaust aftertreatment system for an internal combustion engine. The process includes receiving a used component at 105. The used component can be any of various components of an exhaust aftertreatment system that has been in use for some predetermined amount of time. For example, in some embodiments, the component is one of a filter for capturing particulates in an exhaust gas stream, such as a diesel particulate filter (DPF). In other embodiments, the used component is a catalyst for converting constituents in the exhaust gas stream into less harmful pollutants. The used component received at 105 may be a component assembly that includes a housing or sleeve within which the component is housed. In some implementations, the component is removed from the housing before or after being received at 105. In yet other implementations, the component remains within the housing throughout the process 100.

After receiving the component at 105, the process 100 proceeds to visually inspect the component at 110 for various deformities, imperfections, and/or deposits. In one implementation, the component is visually inspected for oil deposits and/or visible physical damage. If oil deposits are visible as determined at 115, then the component is baked at 120 to remove the oil deposits. Otherwise, if no oil deposits are visible, the component is not baked. Oil deposits tend to prohibit the removal of soot from the DPF when dry cleaned at 135. Accordingly, removing the oil deposits in advance of the dry cleaning step at 135 is desirable.

The component is then inspected for physical damage at 125. If physical damage is visible as determined at 125, then the component is scrapped (e.g., not reused) at 130. Otherwise, if no physical damage is visible, then the process 100 proceeds to dry clean the component at 135. In some implementations, prior to dry cleaning the component at 135, if no physical damage is visible at 125, then the component is physically or virtually labeled and entered into a database for tracking purposes.

The component is dry cleaned at 135 using any of various dry cleaning techniques. In one embodiment, the component is dry cleaned using a pneumatic (e.g., air) cleaning technique, which includes directing a high pressure stream of gas towards the component. In the case of DPF components, the high pressure gas stream is configured to contact the particulate matter accumulated on the DPF and dislodge it from the filter wall. More specifically, dry cleaning is configured to remove ash and soot deposits on the wall of the DPF. Prior to cleaning the component wall, in some embodiments, dry cleaning at 135 may also include cleaning the metal housing or shell of the component. After dry cleaning the component at 135, an airflow test may be performed on the component to determine the level of resistance of air through the component, which provides an indication of the amount of particulate matter removed from the component via the dry cleaning process, as well as the amount of particulate matter left on the component.

Figure 3:
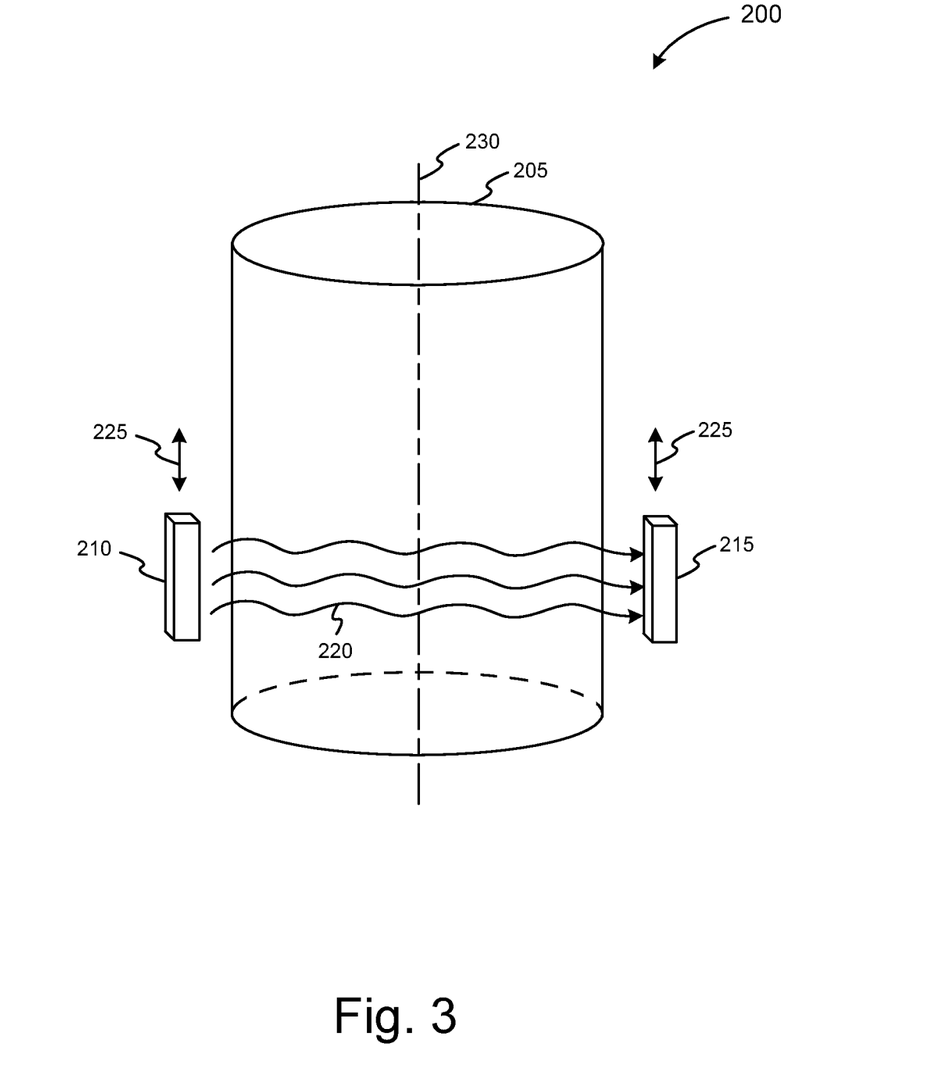
FIG. 3 is a perspective view of an x-ray processing system for inspecting the cleanliness of an exhaust aftertreatment component according to one embodiment.

Following the dry cleaning of the component at 135, the cleanliness of the component is inspected and analyzed via an x-ray processing technique at 140. In one embodiment, the x-ray processing technique provides a 3-dimensional depiction of the composition of the accumulated particulate matter on the filter wall. Referring to FIG. 3, one x-ray processing system 200 for inspecting the cleanliness of a component 205 is shown. The system 200 includes an x-ray beam source 210 and an x-ray beam detector 215. The x-ray beam source 210 generates and emits x-ray beams 220 through the component 205. The x-ray beam detector 215 receives the x-ray beams 220 and detects the intensity of the beams. The x-ray beam source 210 and x-ray beam detector 215 can cooperatively move along the component in an axial direction 225 that is parallel to the central axis 230 of the component 205. In this manner, the x-ray beams 220 are directed toward and pass through the component 205 in a direction that is substantially perpendicular to the central axis 230 of the component. In this manner, the system 200 is configured to generate a side-view analysis of the component 205, as opposed to an end-view analysis as with other inspection techniques.

Figure 2:
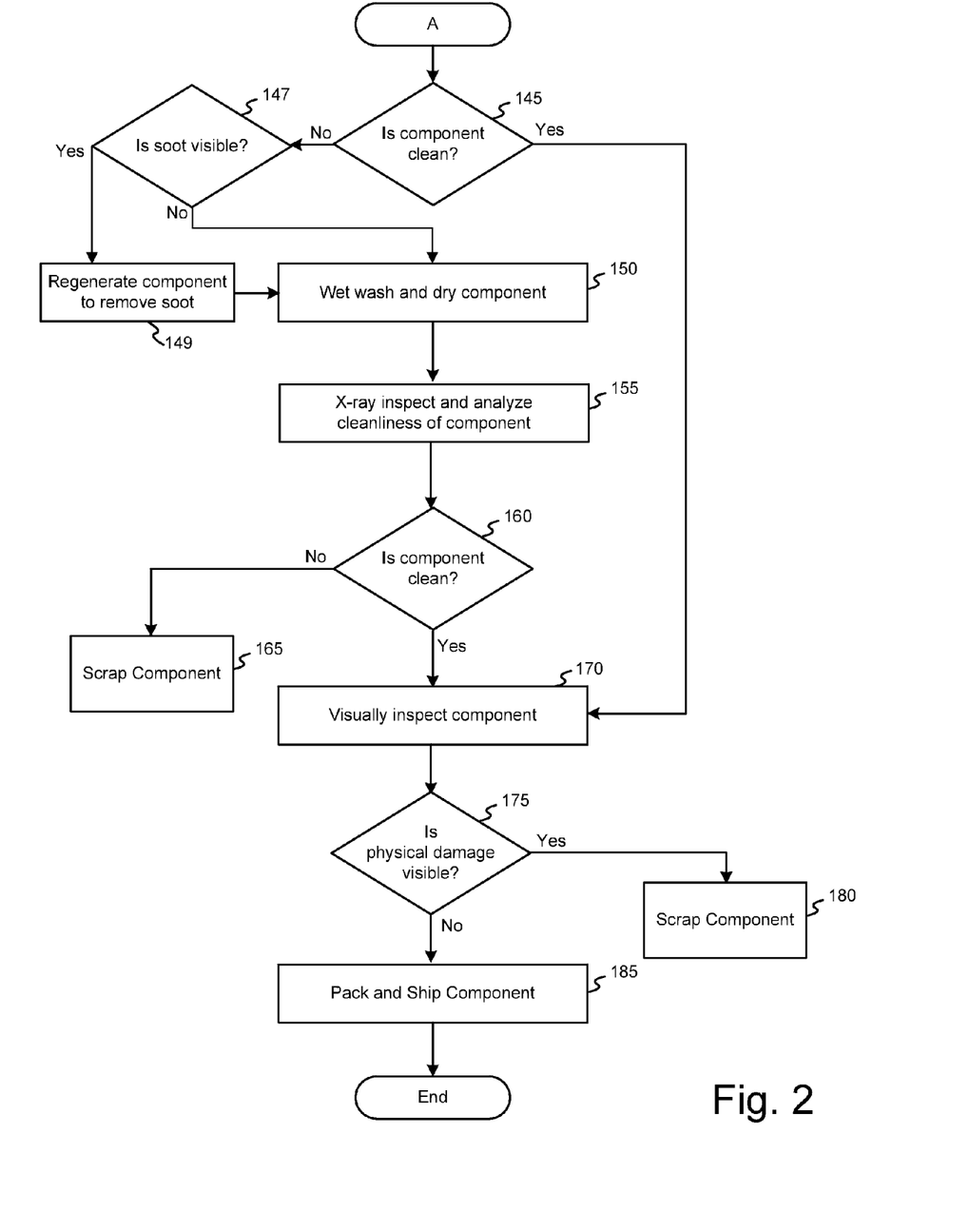
FIG. 2 is a schematic flow chart diagram of a sub-process of the method of FIG. 1 according to one embodiment.

After the cleanliness of the component is inspected and analyzed via the x-ray processing technique at 140, the process 100 proceeds to implement sub-routine A shown in FIG. 2. According to sub-routine A, the process 100 determines whether the component is clean at 145 based on the results of the x-ray process technique. If the determination at 145 is positive, the component again is visually inspected at 170 for physical damage, and packed and shipped at 185 if no visible physical damage is present as will be explained in more detail below. However, if the determination at 145 is negative, the component is eventually wet washed and dried at 150 to further clean the component (e.g., remove ash that is resistant to removal by the dry cleaning process). In other words, the process 100 determines at 140 and 145 whether the dry cleaning sub-process has sufficiently cleaned the component for reuse or if additional cleaning sub-processes are required to further clean the component. In one embodiment, the process 100 utilizes an ultrasonic agitation technique to wet wash the component at 150. The ultrasonic agitation technique may include submersing the component in an acid bath and passing ultrasonic sonic waves through the bath. The ultrasonic waves agitate the acid, which enhances the removal of particulate matter (particularly ash crusts, which are difficult to remove with conventional dry cleaning techniques) from the component wall. According to some implementations, the acid can be any of various inorganic acids or organic acids, such as acetic acid, glycolic acid, and acetic/glycolic acid mixes, among other organic acids.

Part of the wet washing of the component can include rinsing the component following the ultrasonic agitation process and drying the component, such as by using an oven drying technique. Following drying of the component, an additional airflow test may be conducted on the component to determine the level of resistance of air through the filter, which provides an indication of the amount of particulate matter removed from the filter via the wet washing process as well as the amount of particulate matter left on the filter.

After the component is wet washed and dried at 150, the cleanliness of the component again is inspected and analyzed via an x-ray processing technique at 155. If the results of the x-ray process technique show the component is clean at 160, then the process proceeds to visually inspect the component at 170 for physical damage. However, if the determination at 160 is negative, the component is scrapped at 165. In other words, the process 100 determines at 155 and 160 whether the wet washing sub-process has sufficiently cleaned the component for reuse or the component should be scrapped. In some embodiments, if the component is determined not to be clean at 160, then the process repeats the wet washing and drying of the component at 150 and x-ray inspection at 155, and determines whether the component is clean at 160 a second time. In one implementation, if the component is still not clean after the second wet washing, the component is scrapped. In another implementation, if the component is still not clean after the second wet washing, the wet washing process is continued until the component is clean enough. Alternatively, if the component is not clean after the first determination at 160, the process 100 may return to dry clean the component an additional time at 135 before repeating another wet washing of the component.

If there is visible physical damage at 175, the component is scrapped at 180. But if there is no physical damage at 175, the component is packed up and shipped for reuse in an exhaust aftertreatment system. Prior to packing, the process 100 may enter the status of the component in the database for tracking purposes.

Although in the illustrated embodiment of the process 100, the first x-ray inspection and analysis sub-process at 140 is performed after the dry cleaning of the component at 135, in some embodiments, an additional x-ray inspection and analysis step is performed prior to the dry clean sub-process at 135 in order to determine whether a dry clean process is necessary or desired.

Alternatively, in some embodiments, the first x-ray inspection and analysis sub-process at 140 may be performed before the dry cleaning of the component at 135. In such embodiments, the first x-ray inspection and analysis sub-process may be utilized to determine whether the dry cleaning at 135 should be performed and whether the wet washing at 150 should be performed. In other words, a single x-ray inspection and analysis sub-process can be relied upon to determine the necessity of both the dry cleaning and wet washing sub-processes.

Finally, the process 100 may include one or more regeneration steps configured to regenerate the component via conventional exhaust aftertreatment component regeneration techniques. The one or more regeneration steps may be performed before or after the dry cleaning and wet washing steps of the process 100. Further, the x-ray inspection and analysis sub-processes of the process 100 may be used to determine when and whether a regeneration of the component should be performed. For example, in the illustrated embodiments, if the determination at 145 is negative, the process 100 then determines whether soot is visible at 147. If soot is visible (e.g., if it was not sufficiently removed during the dry cleaning sub-process step at 135), the process 100 regenerates the component to remove the soot. But, if soot is not visible (e.g., if it was sufficiently removed during the dry cleaning sub-process step at 135), then the component is not regenerated and the process proceeds to wet wash and dry the component at 150.

The determinations whether the component is clean at 145 and 160 is guided by the x-ray inspection and analysis at 140 and 155, respectively. Generally, each x-ray inspection and analysis of the process 100 is configured to determine at least one condition of the component. In some embodiments where the component is a DPF, the at least one condition of the component can be associated with at least one condition of particulate matter accumulation on the wall of the DPF. In certain implementations, if the at least one condition of the particulate matter accumulation reaches one or more thresholds, then one or more cleaning techniques can be used to clean the DPF or remove particulate matter from the DPF for reuse. For example, the particulate accumulation conditions may dictate if a cleaning process should be executed on the DPF, and if so, which type of cleaning process and, if more than one cleaning process is necessitated, the order of the cleaning processes. For example, in one embodiment, if a particulate accumulation condition reaches a first threshold, but not a second threshold, the process may only execute a dry cleaning of the DPF. However, if the particulate accumulation condition reaches the second threshold, both a dry cleaning and a wet cleaning process may be executed. Further, in embodiments of the process 100 having a regeneration step, some implementations may execute a regeneration process on the DPF if the particulate accumulation condition reaches a third threshold.

Figure 4:
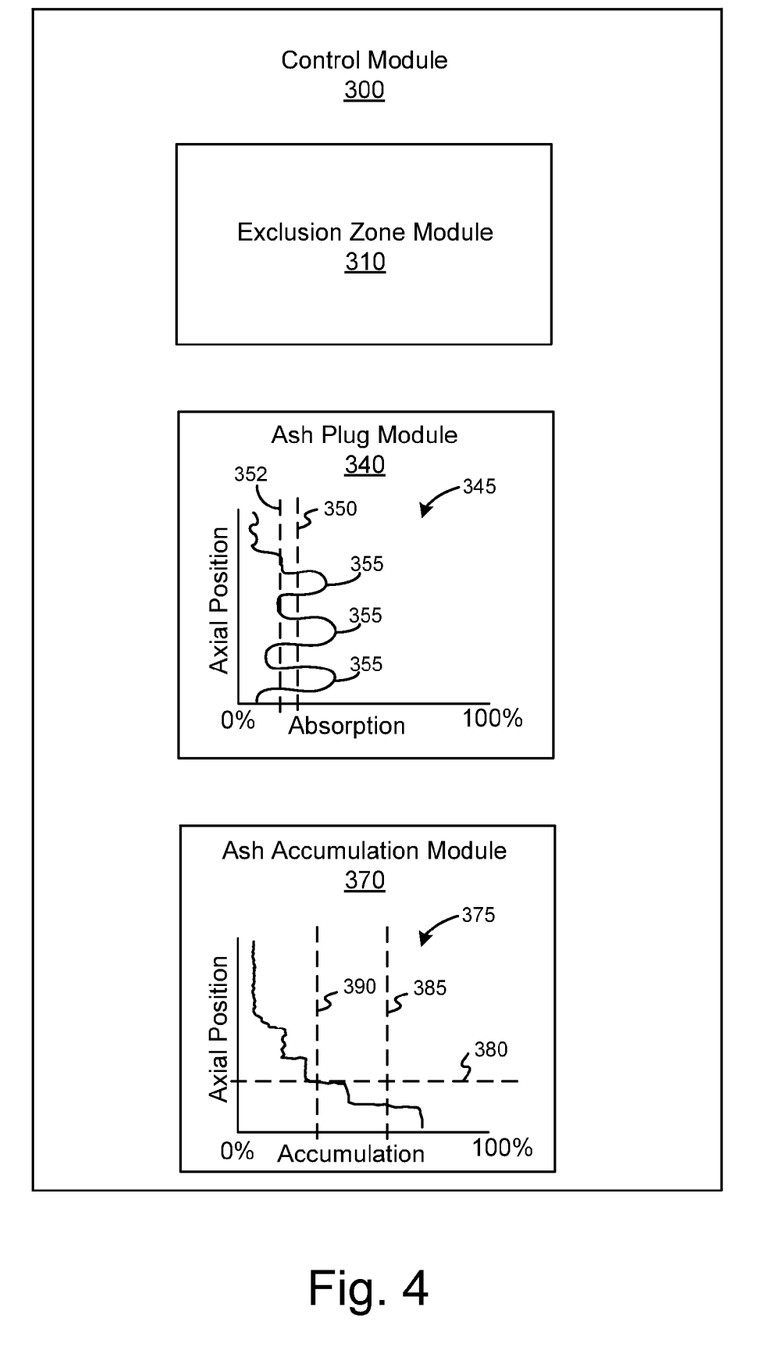
FIG. 4 is a schematic block diagram of a control module for executing an exhaust aftertreatment component cleaning and requalifying process according to one embodiment.

In some embodiments, the x-ray inspection and analysis steps of the process 100 may be executed by a control module 300 shown in FIG. 4. The control module 300 may be configured to receive inputs from an x-ray processing system, such as system 200 of FIG. 3. Generally, the control module processes the inputs received from an x-ray processing system and determines particulate matter accumulation conditions of a component (e.g., DPF) being inspected. In one embodiment, the control module 300 includes an ash plug module 340 that determines the number of ash plug layers along the component, and associated intensities of the layers, and an accumulated ash module 370 that determines the amount of accumulated ash and soot along the component.

The control module 300 also includes an exclusion zone module 310 that is configured to determine which portions of the x-ray produced image are excluded from the particulate matter accumulation analysis. For example, cylindrical DPFs have less material for x-ray beams to pass through along planes containing sectors at the outer edges of the projected view when compared to the diametral path through the center of the DPF due to the curvature of the cylinder. Because there is less catalyst material to pass through at the edges, the image produced by the x-ray tends to show the DPF near the outer edges as being artificially cleaner (e.g., having less particulate matter accumulation). Accordingly, to avoid false negatives and maintain accuracy, DPF zones near the outer edges are excluded from the analysis. The exclusion zone module 310 is configured to either determine the exclusion zones based on the x-ray image, or include predetermined values for the exclusion zones based on the known type, size, and/or configuration of component.

Basically, the ash plug module 340 assists in determining whether the component should be wet washed. The ash plug module 340 includes a chart 345 that plots x-ray beam absorption values at various positions along a central axis (e.g., longitudinally) of a component being inspected. More specifically, an x-ray processing system directs x-ray beams through the component being inspected at a plurality of axial locations along the component and records the intensity of the x-ray beams received by a detector on an opposing side of the component, which is directly correlated with the level of absorption of the beams within the component. The intensity or absorption of the detected x-ray beams varies with variations in the consistency (e.g., density) of the particulate matter accumulated on the wall of the component. For example, as the x-ray beams travel through layers of accumulated particulate matter with high densities, the intensity of the detected x-ray beams decreases because (1) absorption of the x-ray beams into the particulate matter increases; and (2) penetration into the particulate matter correspondingly decreases. Accordingly, the ash plug module 340 can determine the number of ash plug layers by summing the number of absorption peaks 355. Additionally, the ash plug module 340 can determine the densities of the various ash plug layers formed on the wall of the component by equating the high absorption peaks 355 to the density of the respective ash plug layers.

The ash plug module 340 is further configured to determine high and low absorption thresholds 350, 352, which acts as triggers for executing specific cleaning methods as will be explained in more detail with reference to FIG. 5. The thresholds 350, 352 can be predetermined based on experimentation. Generally, when the absorption (e.g., average absorption) of the x-ray beams associated with the plug layers (e.g., absorption peaks 355) are below the low absorption threshold 352, the ash plug absorption for the component is set as low. In contrast, when the absorption (e.g., average absorption) of the x-ray beams associated with the plug layers is between the high and low absorption thresholds 350, 352, the ash plug absorption for the component is set as medium. Further, when the absorption (e.g., average absorption) of the x-ray beams associated with the plug layers is above the high absorption threshold 350, the ash plug absorption for the component is set as high. Generally, the higher the ash plug absorption, the greater the presence of ash crust layers, which may require wet washing for removal and thus directs the cleaning process accordingly.

Basically, the ash accumulation module 370 assists in determining whether the component is clean. The ash accumulation module 370 includes a chart 375 that plots ash/soot accumulation values at various positions along a central axis (e.g., longitudinally) of a component being inspected. The amount of the particulate matter accumulation can be determined by counting the pixels generated by the x-ray imaging process at each of the various positions. The calculated amount of accumulated particulate matter at each location is recorded on the chart 375. Generally, the accumulation is cumulative such that it typically increases along the component's length as individual absorption values are added to each other along the length.

The ash accumulation module 370 is further configured to determine high and low accumulation thresholds 385, 390, which acts as triggers for executing specific cleaning methods as will be explained in more detail with reference to FIG. 5. The thresholds 385, 390 can be predetermined based on experimentation. Generally, when the cumulative accumulation (e.g., cumulative x-ray absorption) of the particulate matter on the component is below the low accumulation threshold 390, the ash accumulation amount for the component is set as low (e.g., the component is relatively clean). In contrast, when the accumulation of the particulate matter on the component is between the high and low accumulation thresholds 385, 390, the ash accumulation amount for the component is set as medium. Further, when the accumulation of the particulate matter on the component is above the high accumulation threshold 385, the ash accumulation amount for the component is set as high (e.g., the component is relatively dirty).

According to another method, the amount of accumulation of particulate matter on or cleanliness of the component can be determined according to the position of an ash depth threshold 380 set by the ash accumulation module 370. Generally, ash left at the outlet end portion of a component or DPF is an indication of the cleanliness, or lack thereof, of the component. Accordingly, when a threshold amount of particulate matter accumulation (e.g., the higher threshold 385) is present below the depth threshold 380, then the cleanliness of the component is set as low or dirty even if the accumulation never meets the threshold 390 at heights above the threshold 380. However, if the accumulation passes 390 only below the threshold depth 380, but doesn't pass the threshold 385, then the cleanliness of the component is set as high or clean. In contrast, if the accumulation passes the lower threshold 390 at any height above the threshold 380, then the cleanliness of the component is set as low or dirty. Of course, multiple depth thresholds 380 can be used in the same manner as the multiple thresholds 385, 390 to set the particulate matter accumulation condition or cleanliness of the component with an even higher level of precision (e.g., one of more than just low and high (e.g., low, medium, and high)).

Figure 5:
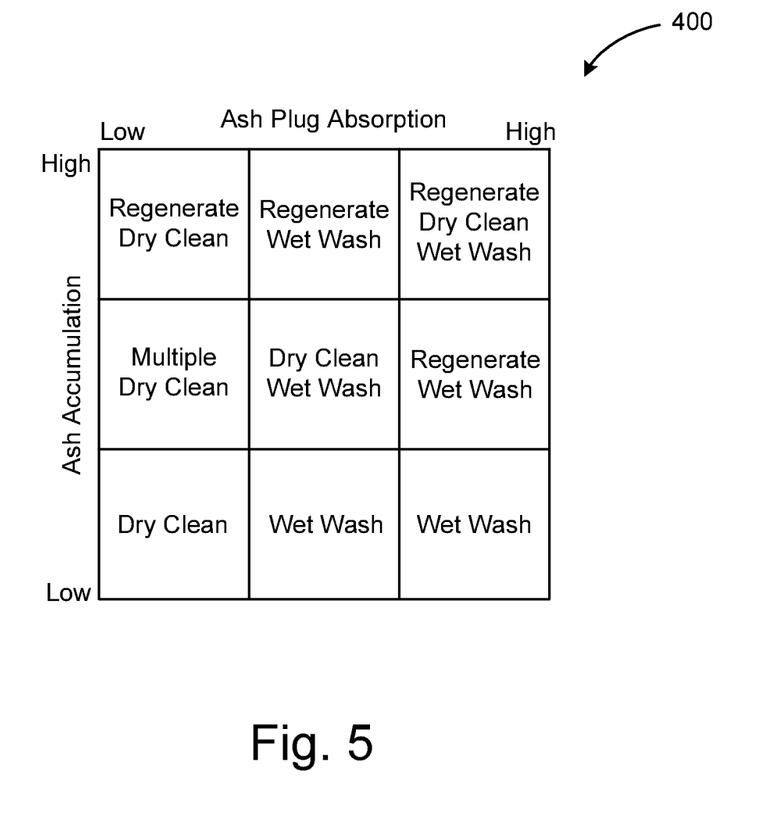
FIG. 5 is a schematic matrix comparing cleaning sub-processes to ash accumulation and plug absorption values according to one embodiment.

According to another cleaning and requalification process, the type and number of cleaning sub-processes executed during the process are determined according to a cleaning matrix 400 of FIG. 5. Based on the particulate matter accumulation conditions of the component, such as the ash plug absorption and ash accumulation status of the component, the precalibrated cleaning matrix 400 determines the type and number of cleaning sub-process to be executed on the component. In one embodiment of the process, at least one x-ray inspection and analysis step is conducted on a component to determine the particulate matter accumulation conditions. According to one implementation, the at least one x-ray inspection and analysis step includes operation of the ash plug and ash accumulation modules 340, 370 to determine the ash plug absorption and ash accumulation statuses of the components being inspected. The ash plug absorption and ash accumulation statuses are then compared against the matrix 400 to determine which of several possible cleaning processes should be performed on the component. For example, if the ash plug absorption status is low and the ash accumulation status is high, then the cleaning matrix 400 dictates a regeneration of the component and a dry cleaning of the component, but no wet washing of the component. In contrast, if the ash plug absorption status is high and the ash accumulation status is high, then the cleaning matrix 400 dictates a regeneration of the component, a dry cleaning of the component, and a wet washing of the component In some implementations of the matrix 400, the order of the cleaning sub-processes also can be dictated.

Following execution of the initial cleaning sub-processes dictated by the matrix 400, another x-ray inspection and analysis step can be conducted on the component to determine new particulate matter accumulation conditions of the component. If the new particulate matter accumulation conditions are acceptable (e.g., fall below minimum thresholds), then the component is ready for reuse. However, if the new particulate matter accumulation conditions are not acceptable for reuse (e.g., remain above minimum thresholds), then the new conditions can be applied to the matrix 400, or other modified matrix, and additional cleaning steps can be performed on the component as dictated by the matrix. In some implementations, a graphical user interface (GUI) is communicable with the control module 300 and configured to indicate (e.g., display) the determined condition (e.g., reusability) of the component, as well as, in certain implementations, the dictated cleaning processes to be executed on the component.

Although the ash plug module 340 and ash accumulation module 370 are configured to set the ash plug absorption and ash accumulation value for the entire component as one of low, medium, and high, in other embodiments, more or less than two thresholds per chart 345, 375 can be used to set the ash plug absorption and ash accumulation value for the entire component as one of more or less than low, medium, and high to provide an even higher level of precision when determining the particulate matter accumulation conditions of the component. Accordingly, the cleaning method matrix 400 of FIG. 5 can be adjusted to include more or less than nine cleaning method combinations.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Additionally, the order in which a particular method occurs may or may not strictly adhere to the order of the corresponding steps shown. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of"means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for cleaning and requalifying a component of an exhaust aftertreatment system, comprising:
   inspecting the component using an x-ray processing technique, wherein the inspecting the component comprises determining a number of plug layers along the component and an associated plug absorption value for each of the plug layers;
   selecting one or more cleaning techniques based at least in part on the determined plug absorption values; and
   cleaning the component using the selected one or more cleaning techniques.

2. The method of claim 1, further comprising:
   determining an accumulation condition of the component using the x-ray processing technique, the accumulation condition indicating an amount of matter accumulated along the component.

3. The method of claim 1, wherein the one or more cleaning techniques comprise a dry clean technique and a wet wash technique.

4. The method of claim 1, further comprising:
   performing a first comparison, the first comparison including comparing the plug absorption values with one or more plug absorption thresholds; and
   performing a second comparison, the second comparison including comparing an accumulation condition with one or more accumulation thresholds.

5. The method of claim 1, further comprising determining an accumulation condition of the component at a depth threshold of the component using the x-ray processing technique, the accumulation condition of the component at the depth threshold indicating an amount of particulate accumulated at an outlet end portion of the component.

6. The method of claim 1, wherein the x-ray processing technique is configured to generate data representing accumulated matter along a side wall of the component along an axial length of the component.

7. The method of claim 1, further comprising determining at least one exclusion zone along the component, and wherein inspecting the component using the x-ray processing technique comprises inspecting only those portions of the component outside of the at least one exclusion zone.

8. The method of claim 2, wherein the accumulated matter includes ash and soot.

9. The method of claim 3, further comprising visually inspecting the component before cleaning the component using the dry clean technique.

10. The method of claim 3, wherein the wet wash technique comprises depositing the component into a bath comprising an organic acid, and ultrasonically agitating the bath.

11. The method of claim 3, further comprising inspecting the component using the x-ray processing technique after cleaning the component using the wet wash technique.

12. The method of claim 3, further comprising determining an ash plug absorption of the component, and wherein the step of cleaning the component using the wet wash technique occurs only when the ash plug absorption exceeds a threshold.

13. The method of claim 4, wherein the selecting one or more cleaning techniques comprises selecting based on the first comparison and the second comparison.

14. The method of claim 4, wherein the selecting one or more cleaning techniques comprises:
   selecting a first cleaning technique in response to determining that the accumulation condition exceeds a first of the one or more accumulation thresholds; and
   selecting a second cleaning technique in response to determining that the accumulation condition does not exceed the first of the one or more accumulation thresholds, wherein the first cleaning technique is different than the second cleaning technique.

15. The method of claim 5, further comprising determining cleanliness of the component based at least in part on the accumulation condition at the depth threshold.

16. The method of claim 9, further comprising baking the component before cleaning the component using the dry clean technique if visual inspection of the component reveals visible oil deposits on the component.

* * * * *